Figure 1:
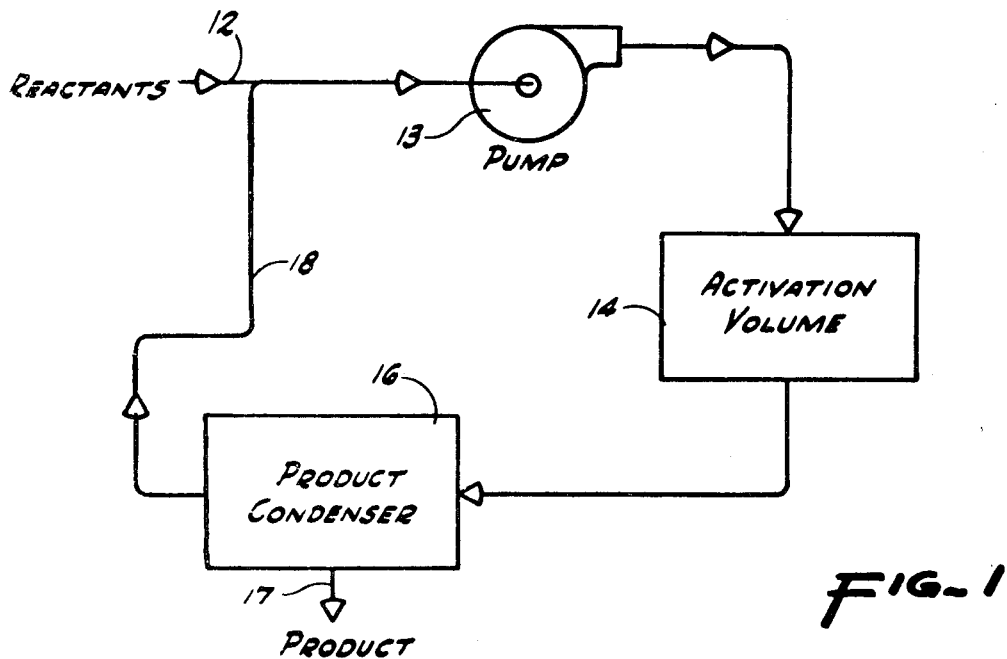

United States Patent

[11] 3,629,081

[72] Inventor  Ray W. Carpenter
              Danville, Calif.
[21] Appl. No. 482,233
[22] Filed     Aug. 24, 1965
[45] Patented  Dec. 21, 1971
[73] Assignee  General Tire and Rubber Company
               Akron, Ohio

[54] METHOD OF PRODUCING METASTABLE GASEOUS CHLORINE OXYGEN COMPOUNDS WITH NUCLEAR FISSION FRAGMENTS
7 Claims, 2 Drawing Figs.

[52] U.S. Cl. .................................................. 204/157.1
[51] Int. Cl. .................................................. B01j 1/10
[50] Field of Search ........................................ 204/157.1
                                                           HE, 157.1

[56] References Cited
UNITED STATES PATENTS
3,334,020   8/1967   Deutsch et al. ............... 204/157.1 X Primary Examiner—Howard S. Williams
Attorneys—Edward O. Ansell and Frank C. Rote, Jr.

CLAIM: 1. A method of synthesizing metastable oxygen-chlorine compounds comprising the steps of passing nuclear fission fragments through at least one of the reactants gaseous chlorine and gaseous oxygen to activate at least one thereof, mixing the activated reactant with the other reactant to form the product compound, and condensing the product compound from the gaseous mixture by cooling.

INVENTOR.
Ray W. Carpenter
BY
Lippincott, Ralle & Hendrickson
ATTORNEYS

METHOD OF PRODUCING METASTABLE GASEOUS CHLORINE OXYGEN COMPOUNDS WITH NUCLEAR FISSION FRAGMENTS

The present invention is directed to an improved method of manufacturing thermodynamically metastable oxychlorine compounds wherein product yield is maximized.

It is known that a variety of oxychlorine compounds such as $Cl_2O$, $ClO$, $ClO_2$, $ClO_3$ and $Cl_2O_7$ are useful as oxidizer components in rocket fuel systems. Conventional chemical manufacturing techniques call for the heating of a mixture of chlorine and oxygen to establish a sufficient temperature for reaction to occur. However, the reaction products are thermally unstable at such temperatures so that only a very low net yield is achieved. High bulk temperature of the reactants appears necessary for the desired reactions, but at the same time causes a substantial decomposition of the reaction products.

The present invention provides an improved method of carrying out oxygen-chlorine reactions to produce metastable oxychlorine compounds, wherein the bulk temperature of the reactants is maintained sufficiently low to minimize decomposition of the reaction products. This is of particular importance when it is considered that oxychlorine compounds containing no elements other than chlorine and oxygen are less stable than a mixture of chlorine and oxygen gases under standard conditions of temperature and pressure. In the following description the term "primary" is employed with oxychlorine compounds as denoting the absence of other elements than chlorine and oxygen forming the molecule of the compound. In order to cause the formation of primary oxychlorine molecules, it is necessary for one or both of the reactive atoms or molecules to be activated to a higher energy state, so that synthesis reactions then result with a subsequent reduction of energy to the level of some primary oxychlorine molecule. Under the circumstances that no further activation of the primary molecule is caused, it is probable that the molecule will continue to exist as such.

Conventional manufacturing processes, however, require heating of the reaction vessel to a necessary reaction temperature so that the reactants therein are heated to approximately the same temperature. Energy transfer by gas molecule collision with the container walls produces molecules of sufficient energy by statistical variation in energy transfer to cause reaction of same with other molecules in the reaction volume to form the metastable product. The product gas so formed is unfortunately metastable at the bulk temperature of the reaction volume, and is thus easily decomposed. This type of reaction processing results in a very low net yield, and the present invention is particularly directed to improvement of the yield.

Figure 2:
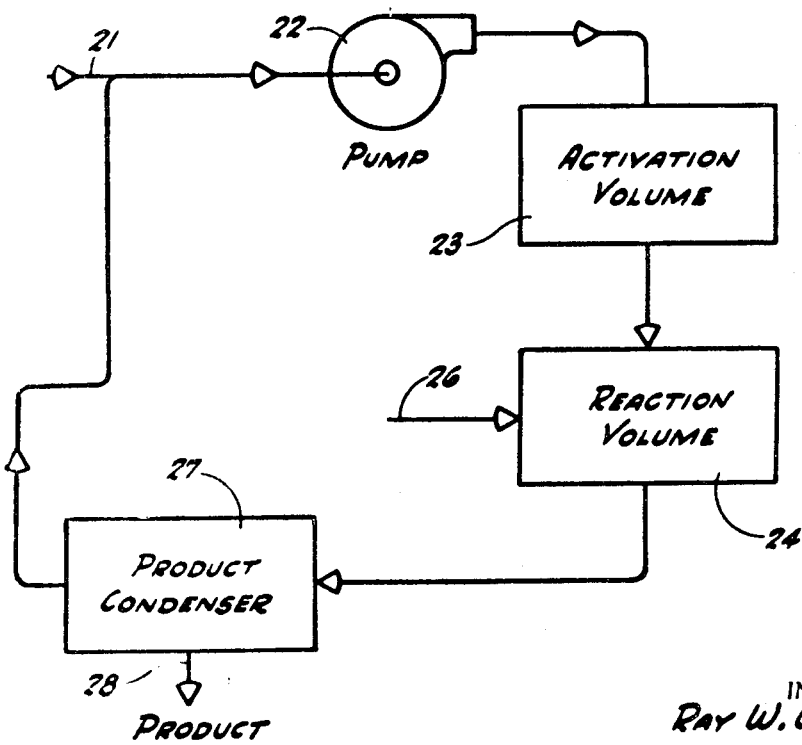

The process of the present invention is schematically illustrated in the accompanying drawings, wherein:

FIG. 1 illustrates the process of directly combining chlorine and oxygen in gaseous form; and FIG. 2 illustrates the flow of reactants in the process of combining chlorine and oxygen, wherein one of the reactants is energized and reacted with a liquid or gaseous reactant.

Considering now the present invention in some detail, the present invention provides for the formation of oxychlorine molecules by the activation of oxygen and/or chlorine to a higher energy state, and the contacting of such activated species with the other reactant. The present invention provides for this activation to be accomplished by the energy of fission fragments resulting from nuclear fission. The high energy of fission fragments is herein employed through collision processes to activate reactant molecules to a high energy state so that they then react with other reactant molecules to form gaseous chlorine-oxygen compounds.

It is known that certain elements subjected to bombardment by thermal neutrons undergo nuclear fission, wherein the nucleus of the atoms splits apart with the release of substantial amounts of energy. Although certain of this released energy appears as various types of radiation, the great majority of energy appears as kinetic energy of the nuclear fragments. In fact, some 80 percent of the released energy appears in the two fragments of the fissioned nucleus. Although the majority of applications of atomic energy employ the fission fragment energy to heat an intermediate fluid, the present invention provides for the direct utilization of this energy in the establishment of reaction conditions. In accordance herewith, atomic fission events are employed to release nuclear fission fragments in a volume containing molecules of at least one of the reactants of the present system, i.e., either chlorine or oxygen. These individual fission fragments traverse the volume to collide with gas molecules therein to produce microscopic regions of extremely high temperature. These activated reactant molecules or atoms then collide with molecules of the other reactant to produce product molecules. The invention thus proceeds in a molecular fashion rather than a bulk manner, and the overall bulk temperature in the reaction volume may be maintained at almost any desired level.

The present invention may be considered to produce requisite high-temperature reaction conditions for carrying out the desired reaction hereof, and substantially instantaneously reducing this temperature. In this manner, the reaction products, which are quite unstable at reaction temperatures, are "frozen" as product molecules, by being substantially instantaneously cooled to the bulk reactant temperature at which they are substantially stable. By maintenance of the bulk temperature at sufficiently low level, the chance of decomposition of the product molecules is greatly decreased over the situations necessarily pertaining in normal synthesis.

Reference is now made to FIG. 1 of the drawing, schematically illustrating the process cycle of the present invention. A reactant mixture 12 is formed of a high-pressure mixture of chlorine and oxygen in gaseous form. This mixture of reactants is then passed by a pump or the like 13, through an activation volume 14, which in this instance also comprises a reaction volume. Within this activation volume, the high-pressure mixture of reactants is subjected to the passage of fission fragments therethrough. Such fission fragments are obtained by nuclear fission of uranium, or the like, in any conventional manner. Insofar as the release of fission fragments into the high-pressure mixture of reactants is concerned, it is noted that the atomic fuel should be dispersed in such a manner that the fragments are released therefrom. The range of fission fragments in solid materials may be quite short; however, the range of such fragments in a gas is substantial. Consequently, the fissionable material or atomic fuel should preferably be employed in finely divided form. This may be accomplished by utilizing so-called dust concepts or glass-wool fuel elements. Both of the foregoing manners of fuel provision are known in the art, and also various other ways of employing very finely divided fissionable material are known in the art.

Within this activation volume 14 fission fragments traversing the high-pressure gaseous mixture of reactants collide with molecules of the reactants, to thereby activate such molecules to a sufficiently high energy level that they, in turn, react with molecules or atoms of the other reactant. This may be symbolically represented by the following equation: $A+B+ff \rightarrow A^*+B \rightarrow AB$; wherein A and B are the species being reacted; $ff$ represents a fission fragment; and $A^*$ is an activated species of one of the reactants. This equation symbolizes the formation of the active species of one of the reactants by collision thereof with a fission fragment, and the combination of this activated species with the other reactant. So far as the present invention is concerned, it is not important which of the species is activated, and thus either chlorine or oxygen may be activated. In the process schematically illustrated in FIG. 1, it is indeterminate whether chlorine or oxygen atoms are activated, for the fission fragments pass through a mixture of the gaseous reactants. The mixture of reactants and reaction products flows from the activation volume 14 which, as noted above, also comprises the reaction volume in this instance. Such a mixture of reactants and products is separated, as schematically illustrated at 16, to thereby produce the product 17 as the output of the process. The remaining gaseous reactants may be recycled, as indicated at 18, with additional reactants being added thereto for maintaining a substantially uniform amount of circulating reactants. So far as product recovery is concerned, it is possible to separate the product by employing a condenser maintaining a sufficiently low temperature to liquefy or solidify oxychloride species present in the flow therethrough.

Further with regard to product separation, there follows a listing of phase transformation points for metastable oxygen chlorine compounds produced by the present invention.

| Gas | Melting Point, °C. | Boiling Point, °C. at 1 atmosphere |
| --- | --- | --- |
| $Cl_2O$ | −120 | +2 |
| $ClO_2$ | −59 | +11 |
| $ClO_3$ | +3 | +203 |
| $Cl_2O_7$ | −91.5 | +80 |

Employing the foregoing transformation temperatures, it will be seen that, for example $ClO_2$ may be condensed from the stream leaving the activation and reaction volume by cooling of this stream to a temperature below +11° C., and this cooling is accomplished in the product condenser 16.

The present invention also contemplates the separate irradiation of a single one of the reactants, and a contacting of this activated reactant with the other. One advantage of this alternative of the present invention is that none of the reaction product is subject to irradiation.

Referring to FIG. 2, there is schematically illustrated a cycle in accordance with the present invention for irradiating only one of the reactants, i.e., either oxygen or chlorine. As shown in FIG. 2, one of the reactants such as high-pressure oxygen 21 is passed by a pump 22 into an activation volume 23 wherein fission fragments from nuclear fission events pass through this high-pressure gas to collide with molecules or atoms therein and activate same. The activated oxygen is then passed directly into a reaction volume or chamber 24 containing a liquid chlorine bath having some small partial pressure of $Cl_2$ above the bath. The provision of liquid chlorine to the chlorine bath in the reaction volume is indicated at 26. The same reaction identified above occurs in the reaction volume wherein activated oxygen molecules combine with chlorine gas molecules above the liquid chlorine bath to thereby produce oxychlorides. The gas in the reaction volume is continuously circulated therefrom through a product condenser 27, wherein the metastable oxychlorides are condensed or precipitated from the flow. These products are removed as indicated at 28, and the gas is then recycled.

It will be appreciated that only a small partial pressure of chlorine gas exists above the liquid chlorine in the reaction volume. While this has the disadvantage of limiting the amount of chlorine gas available for reaction with the activated oxygen, it does also very substantially limit the amount of chlorine gas that leaves the reaction volume without reacting with the oxygen to form desired oxychlorine products. Consequently, only a very minute amount of chlorine gas would pass through the product condenser to be recycled with the high-pressure oxygen, and this has been found to provide no disadvantage to the invention.

As an alternative to the process described immediately above, it is, of course, possible to reverse the reactants to activate high-pressure chlorine gas and pass it through a reaction volume containing liquid oxygen. Under these circumstances, a small partial pressure of oxygen exists in the reaction volume 24, and the activated high-pressure chlorine gas from the activation volume 23 then reacts with this oxygen gas in the reaction volume to produce the desired oxychlorine products. It is to be further noted that the pumping means illustrated in the drawing may, themselves, be employed to establish the desired high pressure of the gaseous reactant or reactants passed through the system. Alternatively, the gaseous reactants may be separately pressurized.

The present invention is particularly directed to a continuous reaction, wherein one or more reactants are at all times cycled through the activation and reaction volumes, as well as the product condenser. It will be appreciated further that only a small amount of desired product is produced from any one unit of reactants in a single pass through the reaction volume. However, the continuity of cycling of the reactant or reactants results in a very substantial yield of desired reaction products.

It may be postulated that enhanced product yield could be attained through liquid reactions, and in this respect the possibilities of employing an aqueous solution of ammonium chloride and high-pressure oxygen gas have been investigated. Irradiation of such an aqueous solution is not as effective as irradiation of a gas mixture, in part because the concentration of chlorine is less than in a high-pressure chlorine gas system, and consequently the fraction of fission fragment energy lost in collision with water molecules is greater than the energy delivered to the aqueous chlorine species. Additionally, the presence of active oxygen in the aqueous solution for reaction with chlorine also reacts with active hydrogen produced by water decomposition. Such active hydrogen also apparently reacts with oxychlorine products produced, and the release of nitrogen radicals causes a wide variety of side reactions which are difficult to control and to accurately assess. Consequently, maximized yield in accordance with the present invention is found to be obtained by the employment of a gaseous system and, of course, the maximization of gas pressure does serve to increase the probability of molecular collisions to produce the desired products.

The present invention has been briefly described above in connection with certain preferred alternative steps, and with brief reference to general process systems. It is not, however, intended to limit the present invention by the precise terms of the foregoing description or particular illustrations of process equipment. Reference is instead made to the following claims for a precise delineation of the true scope of this invention.

What is claimed is:

1. A method of synthesizing metastable oxygen-chlorine compounds comprising the steps of passing nuclear fission fragments through at least one of the reactants gaseous chlorine and gaseous oxygen to activate at least one thereof, mixing the activated reactant with the other reactant to form the product compound, and condensing the product compound from the gaseous mixture by cooling.

2. A method of synthesizing metastable oxychlorides comprising the steps of mixing gaseous oxygen and chlorine, pressurizing the gaseous mixture, bombarding the mixture with nuclear fission fragments to activate gas molecules by collision whereby such activated molecules combine with other molecules to form oxygen-chlorine compounds, condensing said compounds as reaction products, and recycling the remaining oxygen and chlorine with the addition of makeup reactants to maintain a substantially uniform reactant flow.

3. An improved method of synthesizing oxychlorides comprising the steps of circulating at least one of the reactants oxygen and chlorine as a high-pressure gas about a closed loop, subjecting the circulating reactant to bombardment with fission fragments from nuclear fission, mixing the two reactants in gaseous form to thereby synthesize oxychlorides, condensing oxychlorides from reactant mixture by cooling, and adding reactants to the loop to maintain a continuous process.

4. A method as set forth in claim 3 further defined by one of the reactants being provided in a substantially stationary liquid phase to establish a gaseous atmosphere thereabove, and circulating only the other reactant about the loop and over said liquid reactant immediately after fission fragment bombardment.

5. A method as set forth in claim 4 further characterized by the liquid reactant being oxygen and the other reactant being high-pressure chlorine gas.

6. A method as set forth in claim 4 further characterized by the liquid reactant being liquid chlorine and the circulating reactant being high-pressure oxygen gas.

7. A method of synthesizing oxychlorides comprising the steps of raising oxygen and chlorine reactants gas to a high pressure, passing a mixture of said reactants through a volume wherein fission fragments are released by nuclear fission to traverse the moving reactants and activate reactant molecules by bombardment, whereby an active reactant and the other reactant combine into an oxychloride, maintaining the bulk temperature of the gases in said volume below decomposition temperature of oxychlorides, condensing oxychlorides from the reactant mixture as reaction products and continuously recycling the mixture of reactants with the addition of chlorine and oxygen.

* * * * *